No. 641,020. Patented Jan. 9, 1900.
J. W. KOHLHEPP.
SCALDING VAT.
(Application filed Feb. 2, 1898.)
(No Model.)
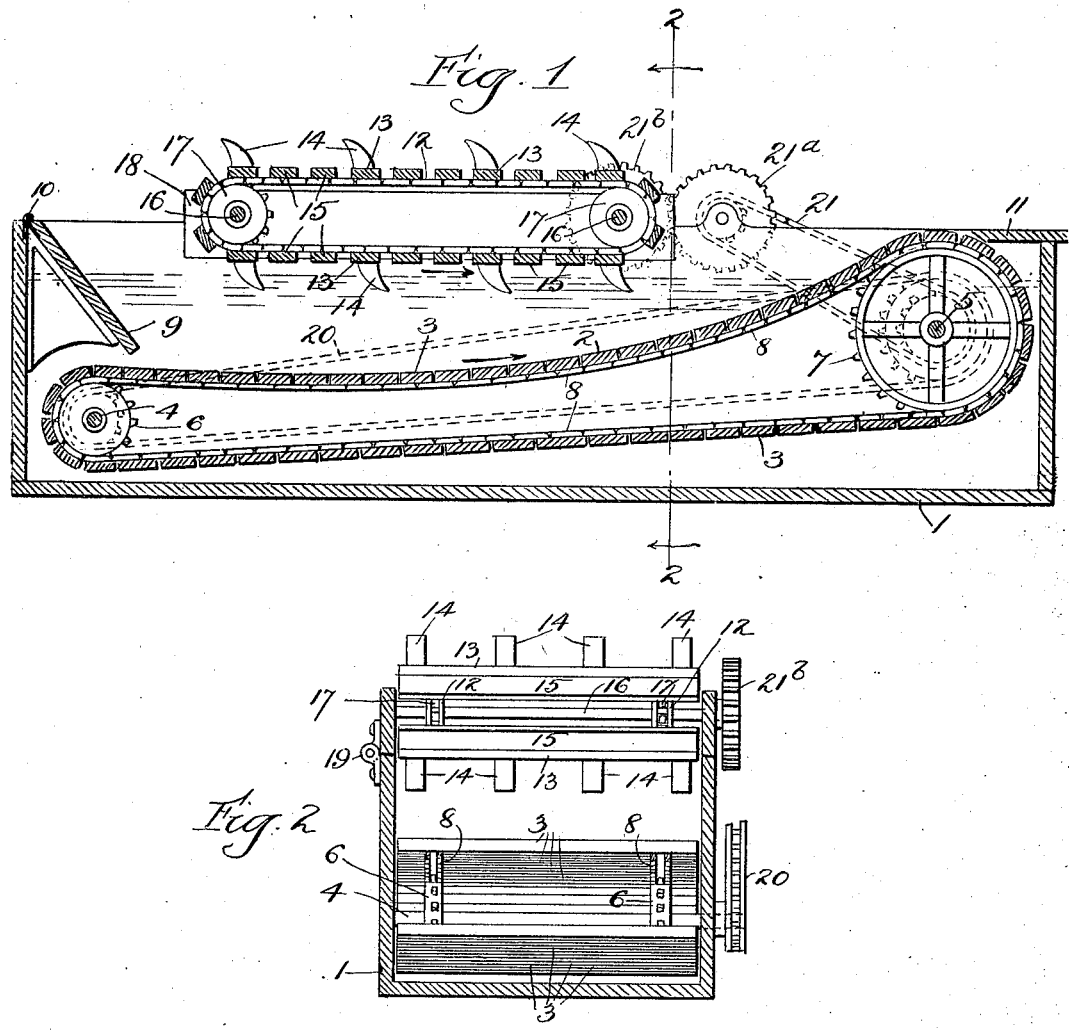
Witnesses
Inventor
J. W. Kohlhepp
By Elliott Hopkins
Attys

UNITED STATES PATENT OFFICE.

JOHN W. KOHLHEPP, OF CHICAGO, ILLINOIS.

SCALDING-VAT.

SPECIFICATION forming part of Letters Patent No. 641,020, dated January 9, 1900.

Application filed February 2, 1898. Serial No. 668,818. (No model.)

*To all whom it may concern:*

Be it known that I, JOHN W. KOHLHEPP, a citizen of the United States, residing at Chicago, in the county of Cook and State of Illinois, have invented certain new and useful Improvements in Scalding-Vats, of which the following is a full, clear, and exact specification.

My invention relates to vats for scalding the carcasses of animals, such as hogs, preparatory to scraping the hair therefrom; and it has for its primary object to provide means whereby the animal may be kept in motion or at least ejected from the vat before it has had opportunity to burn or cook.

Another object of my invention is to hold the animal entirely immersed while passing through the vat.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a vertical longitudinal section of my improved scalding-vat, and Fig. 2 is a transverse sectional view thereof.

In carrying out my invention I employ a tub or vat 1 for containing the scalding water and in which the animals are deposited. Arranged in the bottom of this vat is an endless carrier 2, consisting of a belt composed of a number of cross-slats 3 or constructed in any other suitable or well-known way and running over a pair of shafts 4 5, the shafts, if desired, being each provided with one or more sprocket-wheels 6 7, which engage with sprocket-chains 8, to which the slats 3 are secured. This endless carrier constitutes a traveling false bottom for the vat 1, and upon it or above it the hogs are deposited. One end of the endless carrier is depressed in the vat or arranged near the bottom, as clearly shown in Fig. 1, while the other end is carried upwardly, so as to extend above the water-line, the direction of travel of the upper side of the carrier being toward its upper end, so that the hogs resting thereon will be continuously conveyed upwardly and landed at the upper end of the carrier out of the water and in convenient reach of the attendant, who thereupon removes the animal or attaches it to the usual traveling conveyer or other device employed for conveying slaughtered animals to different points of operation in a slaughter-house. Located above the lower or immersed end of the conveyer 3 is a shield 9, which, if desired, may be hinged at 10 to the upper end of the vat 1, and it is arranged at a slight incline, so as to cover the space between the end of the vat and the carrier, and thus prevent the shanks of the animal from becoming caught in such space, while at the opposite end of the vat is located a table 11, which projects slightly over the end of the carrier for preventing the animals' shanks from following the carrier around into the space at the end of the vat and also for constituting a support for the animal when ejected from the vat.

In scalding animals it is found that some of them sink to the bottom of the vat, and if allowed to remain in one position and in contact with the heated bottom or other surface they cook or burn, while others will float at or near the surface of the water and often project partially therefrom, so that their backs and other parts are not fully scalded. With a vat equipped with my traveling conveyer, however, it will be seen that those which sink to the bottom will be kept in motion and held aloof from the bottom of the vat and gradually worked toward the landing-table 11, thus also making room at the feeding end of the vat for the introduction of more animals.

In order that the vat may have means for holding those which might otherwise float fully immersed in the scalding solution and at the same time kept in motion so as to make room for others, I provide the top of the vat with a series of traveling arms or fingers which move toward the exit end and which serve not only the aforesaid purpose of holding the animals immersed and keeping them in motion, but also of acting, in conjunction with the conveyer 3, for ejecting the animals up onto the table 11. In accomplishing this I employ a pair of endless belts or chains 12, arranged longitudinally of the vat and on each side and having a number of cross bars or slats 13, to which latter are secured any desired number of fingers or arms 14, which, as the chains 12 revolve, project downwardly into the vat and hold the animals fully immersed while advancing them toward the exit end of the apparatus, the arms 14 being preferably curved slightly in the direction of travel, so as to better engage the animals. If desired, the spaces between the slats or bars 13 may be supplied with a number of similar slats 15, arranged sufficiently close together to prevent the shanks or other members of the animals from projecting upwardly between the chains and becoming engaged with the operating mechanism.

The shafts 16, which carry and revolve the sprocket-wheels 17, upon which the chains 12 travel, are preferably journaled in and constitute a part of a frame 18, one of the side members of which is hinged at 19 to one side of the vat 1, so that when desired this hinged frame, together with the series of traveling arms or fingers 14, may be turned back out of the way.

The sprocket-wheels 6 and 7, which carry the endless conveyer 3, may be driven in any suitable way. It is preferable to drive both positively, so that the conveyer will retain substantially the bowed shape or position shown in Fig. 1. I have shown the sprocket-wheels connected together by sprocket-chain 20, one of the shafts 4 5 being driven by crank or by belt from any suitable source of power. (Not shown.) Motion from one of the shafts 4 5 may be transmitted to one of the shafts 16 by sprocket-chain 21 for driving the series of traveling arms or fingers 14, as will be understood.

Having thus described my invention, what I claim as new therein, and desire to secure by Letters Patent, is—

1. A device for scalding carcasses having in combination a scalding-vat, an endless traveling false bottom in said vat extending from the point of introduction for the carcasses to the point of exit, and a series of traveling pushers and depressors arranged at the upper part of said vat over said false bottom and moving in the same direction as the upper fold of said false bottom, for depressing the carcasses toward the bottom and accelerating their advancing movement, whereby the carcasses will be held immersed in the scalding fluid and at all times aloof from the bottom of the scalding-vat and at the same time advanced through the vat, substantially as set forth.

2. A device for scalding carcasses having in combination a scalding-vat provided with a traveling false bottom extending from end to end thereof and having the greater part of its length at one end substantially horizontal and its other end inclined upwardly, the space above the surface of the said false bottom being unobstructed to permit the carcasses to move along with the bottom, and means located in the upper part of the vat and moving with the false bottom for depressing the carcasses below the surface of the scalding liquid, substantially as set forth.

3. A device for scalding carcasses having in combination a scalding-vat, an endless traveling carrier located near and covering the bottom of said vat in a substantially horizontal position and having its upper fold slack and its lower fold taut, the upper fold for the greater part of its length at one end being substantially level or horizontal and the other end being upwardly inclined, and a horizontal series of traveling pusher-fingers arranged over the horizontal portion of said carrier, substantially as set forth.

4. A device for scalding carcasses having in combination a scalding-vat, an endless traveling carrier arranged at the bottom of said vat and extending from end to end thereof, one end of said carrier being upwardly inclined, and a series of traveling fingers or pushers arranged in the upper part of the vat over the intermediate part of said carrier and being of less length than the carrier so as to leave a space between the carrier and both ends of said series of fingers, for the entrance and exit respectively of the carcasses, substantially as set forth.

JOHN W. KOHLHEPP.

Witnesses:
EDNA B. JOHNSON,
F. A. HOPKINS.